April 27, 1965 W. A. SPENCER 3,180,098
SOIL SOLIDIFICATION PROCESS
Filed Feb. 5, 1962
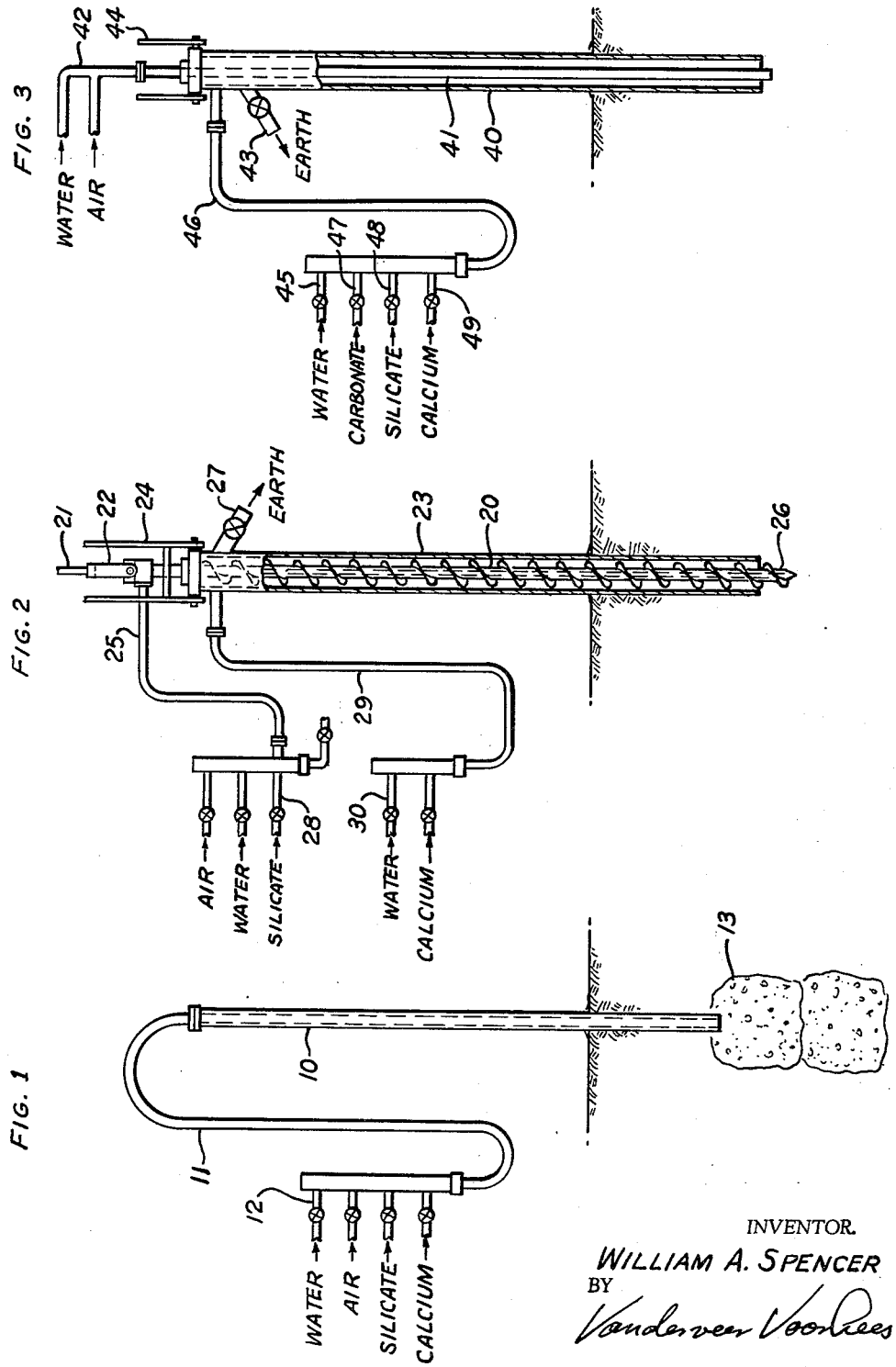
INVENTOR.
WILLIAM A. SPENCER
BY
Vanderveer Voorhees 3,180,098
SOIL SOLIDIFICATION PROCESS
William A. Spencer, Pico-Rivera, Calif., assignor to Spencer Soil Solidification, Inc., Bell, Calif., a corporation of California
Filed Feb. 5, 1962, Ser. No. 170,927
8 Claims. (Cl. 61—36)

This invention relates to a process of solidifying soils by the application of chemicals. The process is particularly adapted to the solidification of sandy and gravelly soils which are sufficiently porous to permit penetration by chemical solutions. The invention also relates to a new method of injecting chemical solutions into soils heretofore found too impervious to be solidified by this method.

Previously, many efforts have been made to solidify loose porous soils by the introduction of chemicals which interact with each other to form a solid, insoluble binder for the soil particles. However, many problems have been encountered which have prevented extensive use of this process. I have now discovered a method by which these problems can be solved. In order to solidify soils with chemicals, it has generally been the practice to inject solutions of sodium silicate and calcium chloride which react with each other to form a binder of calcium silicate. In order to handle these solutions and prevent premature reaction before they reach the desired location in the soil, several devices have been used. It has been the practice to inject the silicate solution and the calcium solution separately to prevent their plugging the injection apparatus. Alternate injection through the same line has also been used. This has involved severe problems with contamination of the injection apparatus by one solution or the other. Many soils containing acids or salts have tended to prevent penetration by the silicate solution so that uneven penetration and unsatisfactory solidification results.

One of the problems in soil solidification is to control the area of the soil to be treated. Complete and uniform dispersion of chemical solutions in the soil is essential to produce maximum strength and satisfactory results. Also, the chemical solutions are relatively costly and their application must be controlled in order to avoid excessive cost in the operation. Soil solidification has many important applications in supporting building foundations, preventing cave-ins when excavating unstable soils in the construction of buildings, highway embankments, water lines, sewer lines, irrigation ditches, etc. My invention relates primarily to improving the penetration of the soil by the chemicals making it possible to apply the chemicals either underground or on the surface where it is desired to prevent sloughing and caving due to the soil drying or to prevent erosion from wind or rain.

This invention is illustrated by a drawing which shows several means for injecting the chemicals into the earth. FIGURE 1 shows a simple injection tube which can be forced into the ground by hand with the aid of water pressure, air pressure or with a smaller, high pressure air jet inside the tube. FIGURE 2 shows an auger type injection tube in which the soil is removed through the inside of the tube. FIGURE 3 shows a construction in which a concentric tube is placed within the drill pipe and air is injected to force out the sand, gravel, etc., as the drill is advanced into the ground, following which the chemical solutions are injected through the pipe.

In the more porous soils in which the voids constitute about 25% to 30% of the volume, about 50 to 60 gallons of chemical per cubic yard is required to fill the voids and effect complete solidification. In the less porous soils a problem is encountered in obtaining adequate penetration. I have discovered that various wetting agents or additives can be applied to these soils to increase the rate of penetration by the silicate solution. Satisfactory wetting agents are preferentially water soluble petroleum oil sulfonates, the alkyl-arylsulphonates, lignin sulfonates, sulfosuccinic acid esters and the sulphonated fatty oils as exemplified by sulphonated caster oil. These wetting agents can be added directly to the silicate solution or they can be separately injected into the soil in advance of the injection of the silicate solution, or in admixture with sodium carbonate solution used to correct soil acidity.

The following is an example of the method of solidifying the soil below the surface to support a foundation. The injection tube is forced into the ground beneath the foundation usually to a depth of at least one or two feet below the depth of any intended adjacent excavation. This could mean 10, 20, 30 or more feet in depth. There is then injected the sodium silicate solution followed by an injection of sufficient water to clear the silicate from the injection tube. Following this, a measured amount of calicum chloride solution is introduced to harden the silicate. Water is again injected in a certain volume to clear the calcium solution from the injection tube. The injection tube is then raised a predetermined number of feet and inches, depending on the thickness required for the supporting column, and the procedure is repeated until the bottom of the injection tube has been raised to a point just below the base of the foundation. The result of this treatment is an irregular column of solidified soil beneath the foundation at that point. This operation is repeated at other locations to provide additional support for the foundation, or frequently at closely spaced intervals to produce a solid continuous wall. The volume of chemical solutions injected at each interval must be carefully metered in order to control the extent of sub-surface penetration.

Water injected between the silicate injection and the calcium injection is called a "spacer." I have discovered that this spacer liquid is more effective for preventing plugging of the lines and the injection equipment if it contains a small amount of a water soluble alkali, such as trisodium phosphate, borax, sodium hydroxide or sodium carbonate. The amount required is usually about 0.1 to 1%. I can also employ a wetting agent in the spacer liquid of the type described above. The amount of wetting agent is usually about 0.02 to 0.1% by weight based on the spacer liquid.

Many soils of an acidic nature have a tendency to coagulate the sodium silicate solution and reduce the extent of penetration obtainable, besides interfering with proper distribution of the silicate. I have discovered that greater strength of solidified soil and deeper, more even penetration can be obtained by pretreating the soil with an aqueous alkaline solution in advance of the silicate solution. The amount required is 5% to 30% by volume based on the volume of silicate solution to be injected.

This pretreatment in combination with the silicate and calcium injections I call the 'three shot method." The solution used for pretreating can have the same composition as that used for a spacer described above. The inclusion of a wetting agent also is advantageous, particularly in "tight" soils. The tightness or density of the soil is easily determined by the rate of flow of fluid in relation to the applied pressure. For a typical injection to a depth of 20 feet using a pressure of 50 p.s.i. on the pretreat solution, a flow rate of less than two gallons per minute in an indication of a tight soil.

I have also discovered that in very tight soils where substantially no liquid will penetrate, preliminary injection of air under pressure will develop sufficient porosity to permit penetration by liquid. The pressure should be controlled in order to avoid producing an upheaval and generally a pressure of less than 1 p.s.i. per foot of depth to the injection point is satisfactory. After the air injection, I have found that the silicate solution will enter the soil and the calcium solution will follow to harden it in place and produce a strong binder imprevious to the flow of water. This method has been used successfully for stopping water penetration through the soil surrounding the walls of concrete missile launching silos at depths of more than 180 feet below the ground surface. I have also discovered that in situations where, due to extreme "tight" conditions, in which no chemical can be injected, by using air pressure in some cases upwards of 100 p.s.i., the formation will permit entry of air but will refuse to permit penetration of chemicals after air injection is stopped. In such cases, air injection is repeated and when flowing well into the formation the silicate solution valve is also opened, allowing silicate to enter simultaneously with the air stream. In order to maintain the "train" of movement, the air pressure is lowered as the silicate pressure is increased. By means of telephone communication between the pump operator and the man operating the valves, careful coordination will result in maintaining uninterrupted flow of ensuing spacer and chemical injections.

The composition of the silicate and calcium solutions which I employ are as follows:

SILICATE

A sodium silicate solution of about 30% to 40% total solids is most effective. This is conveniently made from so-called "water glass" containing about 38% solids, by dilution with water. Sodium silicate having a ratio of $Na_2O$ to $SiO_2$ in the range of 1:2.8 to 1:3.6 is most suitable. I prefer to use a silicate obtainable from Philadelphia Quartz Company under the name of "N" brand, having a soda to silica ratio of 1:3.2 with a concentration of about 38% solids. It is a syrupy, opalescent solution of 41° Bé. (spec. gravity 1.394) with a pH of 11.3. When 20,000 lbs. of this silicate is diluted with 3,000 lbs. of water, the resulting 33% solution is reduced in viscosity, facilitating injection into the soil. The density of this solution is 1.325 or about 11 lbs. per gallon. Further dilution is not desirable where soil solidification of high strength is required.

I prefer to modify the silicate solution by the addition of sodium carbonate and ammonium carbonate, herein referred to as "modifiers." These carbonates form calcium carbonate when the soil is later injected with calcium chloride solution, resulting in a stronger bond than when the silicate is used alone. The amount of modifier used is about 1% to 3% based on the dry weight of silicate. The ammonium salt is more conveniently added as the bicarbonate, and I may add ammonium gas directly to the silicate solution and follow with sodium bicarbonate solution, thoroughly mixing to prevent coagulation of the silicate solution.

A typical composition of silicate solution is as follows:

"N" brand silicate _____gallons__ 1,730
Water _____do____ 290

Thoroughly mix, then add the following solutions in the order given:

(1)
Sodium carbonate _____lbs___ 100
Water _____gallons 40

(2)
Ammonium bicarbonate _____lbs___ 50
Water _____gallons 40

Sodium carbonate monohydrate is more convenient to use because of its rapid solubility, but allowance must be made for the water content.

The resulting solution is stable and can be stored indefinitely until used. The addition of a small amount of wetting agent such as sulphonated castor oil, serves to improve penetration of soil and also prevent scumming of silicate on the surface of the liquid while in storage. For this purpose, I add about 0.05% to 0.2% of wetting agent based on the weight of the water glass.

A suitable sulphonated castor oil for use in my process which is fully compatible with the silicate solution is sold by the Nopco Chemical Company under the designation "1408," with the following specifications:

| | Percent |
|---|---|
| Total alkali | 14 |
| Free alkali | 0.1 |
| Organic $SO_3$ | 6.0 |
| Water | 51.0 |
| Inorganic salt | 2.0 |
| pH of 2% solution 11.3. | |

The calcium chloride solution which I prefer to use to "set" the silicate can be made from dry calcium chloride and water. A convenient form of dry material is sold by the Dow Chemical Company under the name of "Dow-Flake." It dissolves rapidly in water with evolution of heat. I have found that a concentration of 35% to 45% by weight is satisfactory, preferably about 38% to 40%. When 200 lbs. of $CaCl_2$ is dissolved in 40 gallons of water, the resulting solution of 38.5% is convenient to prepare. I may also employ a concentrated $CaCl_2$ brine of 48% strength and dilute it to 40% before injection. The density of this solution is about 1.4 or 11.5 lbs. per gallon.

For most solidification work I employ about 2 gallons of calcium chloride solution for each 3 gallons of silicate solution. This is equal to a mol ratio of about 2 $CaCl_2$ to 1 $Na_2O$ in the silicate. This ratio may be varied somewhat depending on the application, but usually the calcium chloride will exceed the soda in the silicate by a mol ratio of 1.5 to 2.5.

In earlier attempts to chemically solidify the surface of embankments to prevent drying and caving and to solidify sandy surfaces generally to prevent wind and rain erosion, it was found impossible to gain penetration by silicate solutions. I have solved this problem by first applying a water solution of wetting agent containing 1 to 5 lbs. of wetting agent per 100 gallons, with or without sodium carbonate, then before drying, applying the silicate solution containing an additional wetting agent such as sulphonated castor oil as above described, using an adjustable spray nozzle for the purpose. Soils which refused to absorb more than ¼ gallon per sq. yd. when sprayed directly with silicate were found to absorb from 1 to 2 gallons per sq. yd. after the preconditioning treatment. Spraying with calcium chloride solution then hardened the surface to a depth of ¼ inch to 1¾ inches giving it the character of sandstone or concrete. The physical characteristics of the soil particles determine the depth of penetration and the amount of chemical solution required, by reason of capillary attraction. For surface treating, I sometimes obtain deeper penetration with silicates of lower $SiO_2$ content, for example 2.4 to 2.9 $SiO_2$ per $Na_2O$.

The procedure for testing soils hardened by my method is as follows: A sample of soil is packed into a cylindrical mold 2 inches in diameter by 4 inches long, and the chemicals are injected into the soil in their proper order, viz:

(1) Pretreat with dilute carbonate and wetting agent.
(2) Inject silicate under pressure.
(3) Inject calcium under pressure.
(4) Enclose the specimen in a plastic bag to prevent drying until maximum hardness is obtained, (10 to 14 days).
(5) Dry the specimen at ambient temperature and test for crushing strength.

Number 16 sand tested under these conditions gives a crushing strength of 200 p.s.i. to more than 400 p.s.i.

Referring to the drawing, FIGURE 1 shows the use of a simple air jet soil penetrator 10, which is simply a tube through which air is forced to expel the soil up around the outside of the tube. This apparatus is suitable for loose soils and can be handled by hand to a depth of 10 to 15 feet using a tube of ½ inch to 1 inch diameter. A flexible hose connection 11 leads to the air supply as indicated. When the tube has reached the desired depth, air is shut off by the valve shown and water containing the soil neutralizer and wetting agent, as described above for pretreatment, is introduced by the valved line 12, a measured amount being injected. The amount of pretreatment solution is usually about 5% to 25% of the volume of silicate solution which follows.

The water or wetting solution is then shut off and a measured volume of silicate is injected, the amount being calculated by the estimated soil porosity and the area of soil to be solidified. (A rule of thumb resulting from experience is that the percentage of voids doubled would approximate the number of gallons required to solidify one cubic yard of soil.) The silicate is then shut off and the line flushed with a calculated amount of the pretreat water solution. Then the calcium chloride solution is injected as described herein above. Following the calcium chloride, the line is again flushed with a definite quantity of pretreat water solution, the carbonate or other alkali therein serving to precipitate traces of calcium remaining in the line and prevent gelling of the silicate in the following operation.

When the required number of gallons have been injected into the soil at the first elevation, the injector 10 is raised to the next elevation and the operation repeated. Preliminary flushing of the line is begun as the injection pipe is raised and continues until the area at the next elevation has been completely flushed and the soil neutralized. The sequence of pretreating, chemical injections, flushing, etc., is repeated until final injection close to the surface or immediately beneath a footing to be supported, is accomplished. The solodified soil forms a concreted column of irregular shape as shown at 13.

The apparatus shown in FIGURE 2 is an auger 20 with spiral flights driven by shaft 21 through packing 22. The auger is contained in casing 23 and the assembly is lowered into the earth by a crane or other means of support through suspension yoke 24. During the boring operation, water and/or air are forced through flexible connection 25 through the hollow shaft of the auger, entering the soil through ports in the tip, 26, thereby assisting in discharging earth through valved outlet 27. When the desired depth is reached, outlet 27 is closed and water containing a wetting agent is injected by line 25, followed by silicate from line 28, until the desired amount has been injected. Then calcium chloride is injected by flexible connection 29, entering the soil through the casing 23 and hardening the silicate in place.

After the proper amount of calcium chloride solution has been injected, the drill is retracted to the next higher position and the operation repeated to form a solidified column or wall underground. With this method of operation, the spacer liquid can be dispensed with. When the operation is complete, the calcium solution is flushed from the casing and auger by a stream of water, preferably containing sodium carbonate, introduced by line 30.

Referring to FIGURE 3, the drill shown is a non-rotating device with a casing 40 and central air tube 41, supplied by air and/or water through flexible line 42. Earth blown up through the casing 40 is ejected at 43, which can be closed after the drill has reached the desired depth. Yoke 44 supports the drill from a suitable derrick or crane by which it is moved from place to place, raised and lowered into position. To inject the soil solidifying solutions, the same cycle described above is employed. Water containing a wetting agent is injected through line 45 and flexible hose connection 46. Simultaneously, carbonate solution can be injected from line 47 if desired. The silicate solution is injected through line 48, followed by spacer solution from 45 and 47, then calcium chloride solution through line 49.

Although I have described numerous applications of my invention to various soil solidification problems, no limitation of the invention is intended thereby. Thus I have found that leaks in underground sewer lines can be shut off without excavating and with resulting savings in labor and material The leaks were located by dragging a waterproof, marine type closed circuit television camera through the sewer, then injecting the required silicate and calcium solution from the surface to the area of the leak. Where the ground water level was high and a large leak was involved giving a heavy flow of water into the sewer, I have found it advantageous to suspend wood pulp, sawdust, disintegrated paper or other fibrous material in the silicate solution to aid in stopping the flow momentarily until the calcium chloride can be injected to solidify the soil surrounding the line. In the case of sanitary sewers where the water must be treated, considerable savings result from preventing ground water entering the sewer.

Having thus described my invention, what I claim is:

1. The method of solidifying unstable soils of low permeability in place which comprises the following steps:
    (a) Pretreating the soil with a water solution of a wetting agent containing about 1 to 5 lbs. per 100 gallons, then;
    (b) Impregnating the pretreated soil with a solution of sodium silicate, then;
    (c) Introducing a solution of calcium chloride to interact with the silicate solution.

2. The method of claim 1 where the solutions are all introduced in sequence through a single injection line under pressure below the surface of the ground, and a spacer liquid is injected before and after the calcium chloride solution to prevent reaction within the injection line.

3. The method of claim 1 wherein the solution employed in the pretreating step contains a water soluble alkali in addition to said wetting agent.

4. The method of claim 1 wherein air is injected simultaneously with said silicate solution in step (b) when operating in tight soils, thereby increasing soil penetration.

5. The method of claim 1 wherein the said wetting agent is the sodium salt of sulfonated castor oil.

6. The method of hardening the surface of porous soils of low permeability in place which comprises:
    (a) Spraying a water solution of a wetting agent on said surface in a concentration of 1 to 5 lbs. per 100 gallons;
    (b) Next spraying onto said surface a solution of sodium silicate having a ratio of $Na_2O$ to $SiO_2$ of 1:2.4 to 1:2.9 in a concentration of about 30 to 40% by weight;
    (c) Then solidifying said surface by spraying thereon a solution of calcium chloride containing about 35 to 45 percent by weight in water.

7. The method of hardening soil of low permeability, in place, comprising initially treating the soil with a solution of a wetting agent in water, then injecting into said soil a solution of sodium silicate and a wetting agent, thereafter injecting into the silicate treated soil a solution of calcium chloride in amount sufficient to coagulate said silicate and bind the soil particles.

8. The method of claim 7 wherein the solution of wetting agent employed for initially treating said soil contains a water soluble alkali in a concentration of about 0.1 to 1% to neutralize soil acids which otherwise coagulate silicate and reduce penetration.

(References on following page)

References Cited by the Examiner

UNITED STATES PATENTS

| | | | |
|---|---|---|---|
| 1,942,299 | 1/34 | Lemmerman | 106—82 |
| 2,025,948 | 12/35 | Jorgensen | 61—36 |
| 2,090,626 | 8/37 | Grebe | 61—36 X |
| 2,207,759 | 7/40 | Reimers. | |
| 2,311,272 | 2/43 | Ware | 106—82 |
| 2,437,387 | 3/48 | Hodgson | 61—36 |
| 2,449,346 | 9/48 | Vannoy | 106—74 |

FOREIGN PATENTS

| | | |
|---|---|---|
| 488,275 | 5/38 | Great Britain. |
| 659,753 | 10/51 | Great Britain. |

OTHER REFERENCES

Bede Airless Spray System, Installation Operation and Maintenance Manual, published by Bede Inc., 1110 Brook Park road, Cleveland 9, Ohio, page 10, received in Div. 25 of U.S. Patent Office, May 1954.

EARL J. WITMER, *Primary Examiner*.

JACOB L. NACKENOFF, *Examiner*.